United States Patent [19]
Giehl

[11] Patent Number: 5,791,806
[45] Date of Patent: Aug. 11, 1998

[54] POSITIONABLE CONNECTOR FOR MODULAR PANELS

[75] Inventor: Norbert Giehl, Korschenbroich, Germany

[73] Assignee: Modul International GmbH, Neuss, Germany

[21] Appl. No.: 764,445

[22] Filed: Dec. 12, 1996

[51] Int. Cl.$^6$ ..................................... F16B 12/00
[52] U.S. Cl. .............. 403/117; 403/217; 403/169; 403/381; 52/731.5; 52/731.9; 52/282.2; 160/135; 16/321
[58] Field of Search ............... 403/381, 3, 4, 403/171, 169, 217, 119, 117, 113; 52/720.1, 731.5, 731.9, 733.2, 282.2; 160/135; 16/321

[56] References Cited

U.S. PATENT DOCUMENTS

| | | |
|---|---|---|
| 3,186,561 | 6/1965 | Strassle . |
| 3,688,461 | 9/1972 | Rensch . |
| 4,101,231 | 7/1978 | Streib ............................ 52/282.1 X |
| 4,388,786 | 6/1983 | Gassler ............................ 52/282.1 |
| 4,490,064 | 12/1984 | Ducharme . |
| 4,493,172 | 1/1985 | Jones ............................ 52/282.2 |
| 4,544,300 | 10/1985 | Lew et al. . |
| 4,652,170 | 3/1987 | Lew . |
| 4,689,929 | 9/1987 | Wright . |
| 4,805,365 | 2/1989 | Bastian ............................ 52/282.2 |
| 4,941,763 | 7/1990 | Euteneuer . |
| 5,048,995 | 9/1991 | Beaulieu . |
| 5,269,619 | 12/1993 | Warkus et al. . |
| 5,277,512 | 1/1994 | Dwillies . |

FOREIGN PATENT DOCUMENTS

| | | | |
|---|---|---|---|
| 2539827 | 7/1984 | France | ............................ 403/217 |

OTHER PUBLICATIONS

Undated Modul brochure (admitted prior art by applicant).

*Primary Examiner*—Anthony Knight
*Assistant Examiner*—William L. Miller
*Attorney, Agent, or Firm*—Marshall, O'Toole, Gerstein, Murray & Borun

[57] ABSTRACT

A connector for creating exhibits having one piece including a series of grooves (used for connecting panels) arranged at fixed angles with respect to each other. The connector also includes a second piece that is trapped within the other piece. The second piece has a groove that can be arranged at a range of angles with respect to the other grooves.

8 Claims, 2 Drawing Sheets

FIG. 1
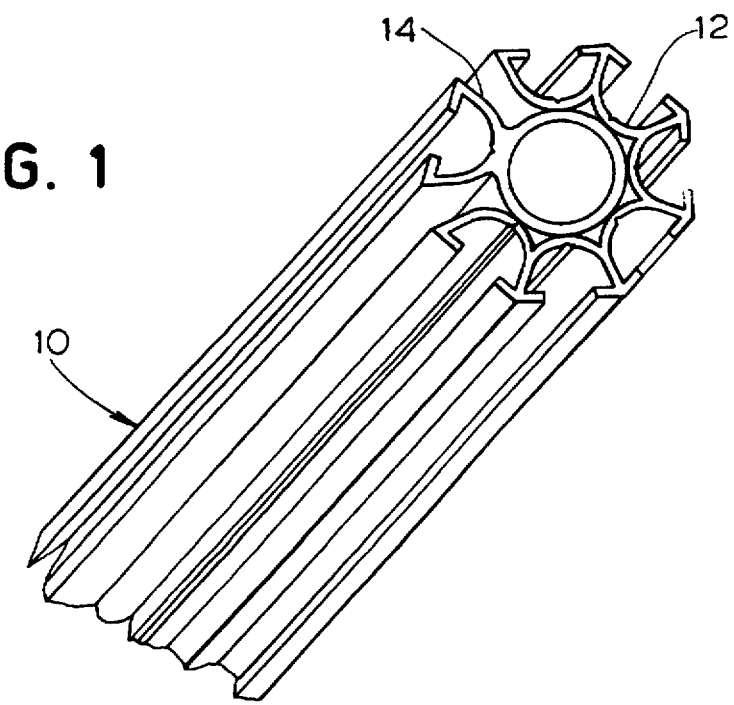
FIG. 2
PRIOR ART
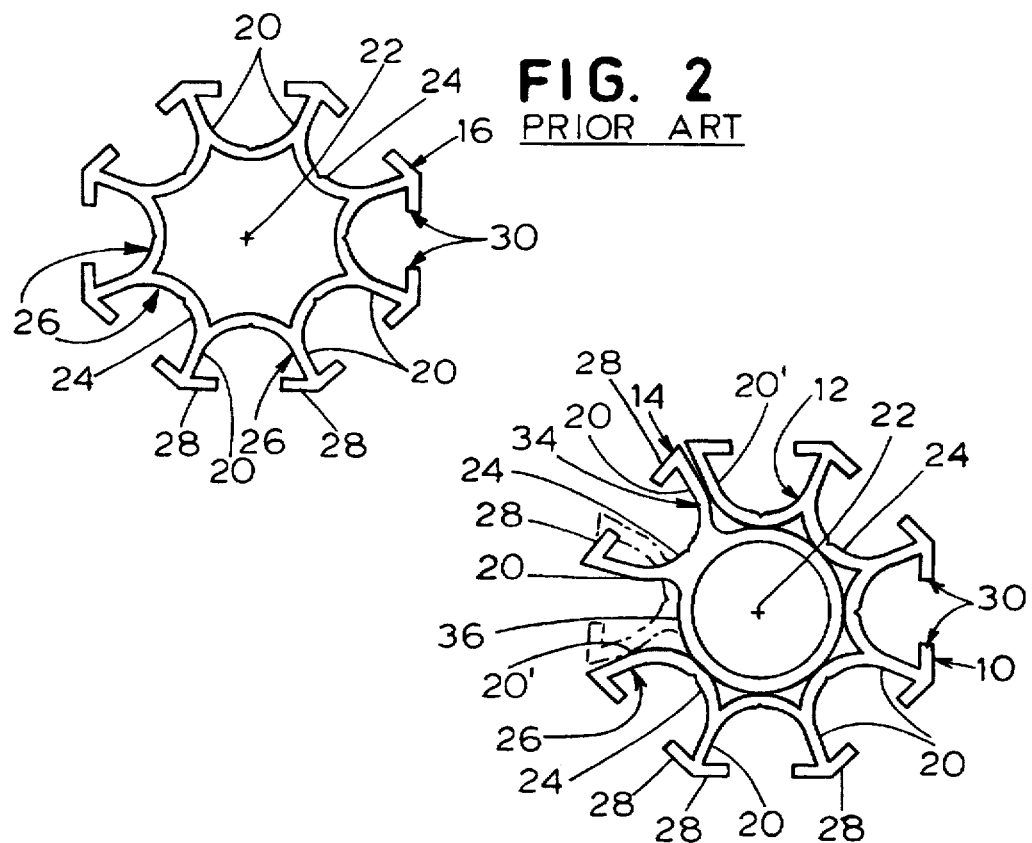
FIG. 3

POSITIONABLE CONNECTOR FOR MODULAR PANELS

TECHNICAL FIELD

The present invention relates generally to connectors for connecting modular panels, and more particularly to connectors used in creating the types of exhibits displayed at trade shows and the like.

BACKGROUND ART

It has long been known that tubular connectors can be used to connect modular panels to create trade show displays. Examples of tubular connectors that could be used for such purposes can be found in U.S. Pat. Nos. 5,227,512; 4,941,763; 4,689,929; 4,652,170; 4,544,300; 4,490,064; and 3,186,561. Other common brackets are the "S60" and "S80" connectors sold by Modul International. In each instance, the connector comprises a groove in which an end of a modular panel can be rigidly secured. The problem with such connectors, however, is that the grooves are set at fixed angles with respect to each other, allowing connection of adjacent panels only at those same specific angles.

There has been a need for a low-cost connector that provides greater flexibility.

SUMMARY OF THE INVENTION

I have invented a new, positionable connector that allows panels to be connected not only at specific fixed angles, but also at a range of angles. The connector can be made by an extrusion process, thus allowing it to be manufactured at a minimal cost.

The new connector has been created by deleting two adjacent grooves from a conventional, eight-grooved, extruded connector and filling the resulting void with a single groove connected to an inner ring. The inner ring is mounted for rotation about the center of the connector. Thus, the main body of the connector has six grooves disposed at 45° angles with respect to each other. The rotatable second body has a seventh groove that can rotate about the common origin through an angle of up to about 33°.

BRIEF DESCRIPTION OF THE DRAWINGS

FIG. 1 is a partial orthogonal view of the preferred embodiment of the positionable connector.

FIG. 2 is a cross-sectional view of a conventional, "S 80" connector previously known in the art.

FIG. 3 is an enlarged cross-sectional view of the positionable connector shown in FIG. 1.

DESCRIPTION OF THE PREFERRED EMBODIMENTS

Figure 4:
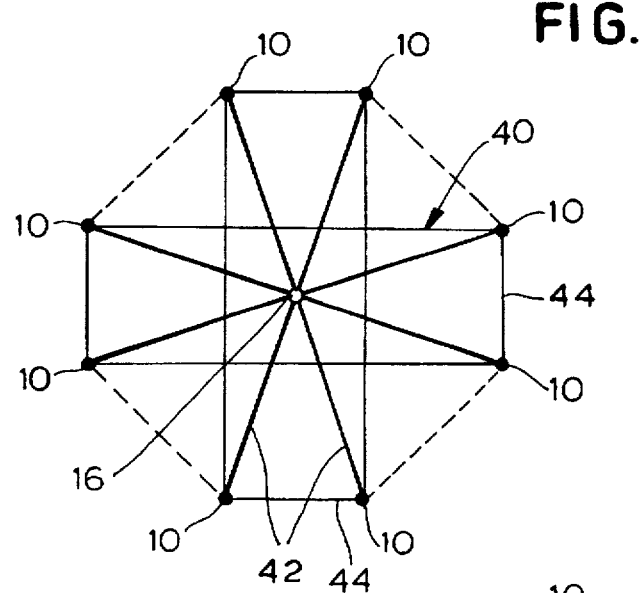
FIG. 4 is a plan view of a display configuration that can be created using the positionable connector.

As seen in FIG. 1, the positionable connector 10 comprises a main body 12 and a rotatable second body 14. Both bodies have a consistent cross-section throughout their length, and thus can be made by an extrusion process. The connector is preferably made of aluminum for strength and light weight. The illustrated embodiment is preferably offered in 5-meter lengths, but can of course be sold in any length.

The main body 12 is a modification of a conventional, eight-sided connector 16 shown in FIG. 2 and sold by Modul International as an "S 80" connector. As best seen in FIGS. 2 and 3, both the conventional connector 16 and the main body 12 of the positionable connector 10 have a series of radial segments 20 disposed at 45° angles to each other about a common axis 22. In the illustrated embodiment, the outer ends of adjacent radial segments are approximately 19.0 cm from each other. Adjacent radial segments are connected by rear seating walls 24 to define grooves 26. As illustrated here, the opposed inner faces 28 of adjacent radial segments and the rear seating walls have a slight curvature and define a continuous wall. It would also be possible to manufacture the connector so that the radial segments and rear seating walls have faces of a more planar configuration, and are separated by clearly defined joints.

Each groove 26 has two outer walls 28, one at the outer end of each of the two radial segments 20 defining the groove. The two outer walls on each groove extend toward and are co-planar with each other, and leave apertures 30 opening to each groove. In the illustrated embodiment, each of the outer walls 28 intersects its respective radial segment 20 approximately 24.8 cm from the axis 22, and the apertures 30 are approximately 8.5 cm wide.

The grooves 26 provide a conventional means for connecting modular panels. As is well-known in the art, a panel (not shown) is fastened to the connector by sliding the connector with respect to a panel along a line parallel to the axis 22, so that a projection on an end of the panel is trapped in one of the grooves by the outer walls 28 on that groove. When fastened, the panel extends perpendicularly to the outer walls 28 at which the panel is fastened, and radially from the axis 22.

Connecting two panels to different grooves on the conventional connector 16 (FIG. 2) or on the main body 14 of the positionable connector 10 allows the panels to be arranged at 45°, 90°, 135°, or 180° angles to each other.

While the conventional connector 16 has a ring of eight grooves 26, the main body 12 of the positionable connector 10 (FIG. 3) has only six grooves, arranged in a single continuous series. The deletion of two consecutive grooves from the conventional connector leaves the two end radial segments 20' on the positionable connector 10 disposed at right angles to each other.

The inclusion of the second body 14 in the positionable connector 10 allows significantly greater flexibility in the angles at which panels can be fastened. The second body has a rotating groove 34 that is positioned between the two end radial segments 20' on the main body 12 of the positionable connector. The rotating groove has radial segments 20, a rear seating wall 24, and outer walls 28 like those of the other grooves 26, and thus can be used to fasten a panel to the positionable connector 10. The rotating groove 34 is connected to an inner ring 36 trapped by the six rear seating walls 24 on the main body 12 for rotation about the axis 22. Preferably, the ring has a circularly-cylindrical outer surface to facilitate rotation.

The configuration of the illustrated positionable connector 10 allows rotation between the main body 12 and the second body 14 through an angle of approximately 33°. Thus, by fastening one panel to the connector 10 at the rotating groove 34 and another panel at an adjacent groove 26, the two panels may be disposed at any angle from approximately 51° to approximately 84°. By fastening the second panel at other grooves 26, the two panels may be disposed at any angle from approximately 96° to 129° or from 141° to 174°. Of course, fastening both panels to grooves on the main body allows the panels to be fixed at 45°, 90°, 135°, or 180°, just as on a conventional fastener like that shown in FIG. 2.

Through the use of positionable connectors 10, internal connections can be provided to strengthen conventional displays. FIG. 4, for example, shows a plan view of an octagonal display 40 using eight rotatable connectors 10 and one conventional connector 16. As shown, the panels 42 extending inwardly from the rotatable connectors are disposed at an angle of approximately 67° from the panels 42 forming the outer face of the display. Such positioning is impossible with conventional four-sided, six-sided, or eight-sided connectors.

Figure 5:
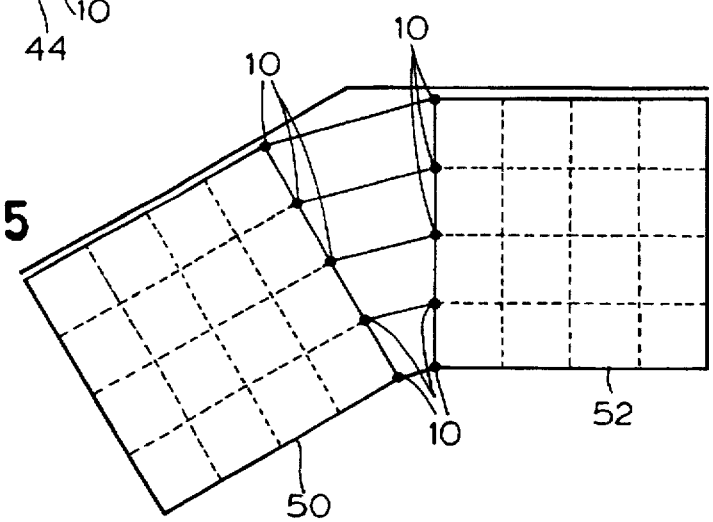
FIG. 5 is a plan view of another display configuration that can be created using the positionable connector.

As seen in FIG. 5, positionable connectors 10 allow two displays 50, 52 to be connected at a slight angle. Again, such positioning is not possible with conventional four-sided, six-sided, or eight-sided connectors.

Figure 6:
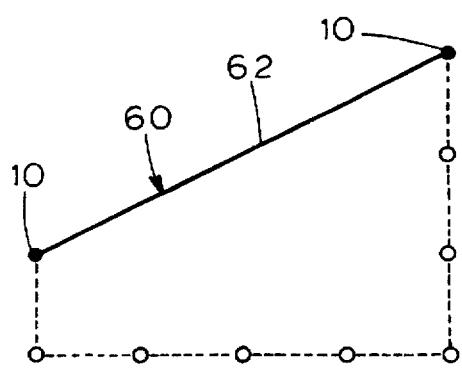
FIG. 6 is a side view of yet another display configuration that can be created using the positionable connector.

Finally, as seen in FIG. 6, positionable connectors 10 allow greater flexiblity in the creation of a non-horizontal display 60. As shown, the positionable connectors allow the top surface 62 of the illustrated display to be angled at approximately 26.5° with respect to the horizontal.

Numerous modifications and alternative embodiments of the invention will be apparent to those skilled in the art. Accordingly, this description is to be construed as illustrative only and is for the purpose of teaching those skilled in the art the best mode of carrying out the invention. The details of the structure may be varied substantially without departing from the spirit of the invention.

I claim:

1. A connector for creating exhibits, the connector having a uniform cross-section and comprising:
   a first set of radial segments disposed at equal distances from a common axis and connected to each other by a series of rear seating walls to form a first set of continuous grooves defining a gap between the first groove and the last groove;
   an inner ring trapped by the series of rear seating walls for rotation with respect to the rear seating walls about the common axis;
   two other radial segments connected to the inner ring and to another rear seating wall to form a rotable groove; positioned in the gap and an outer wall at an outer end of each radial segment on each groove in the first set of grooves, each outer wall on such a groove extending toward the outer wall on the same groove.

2. The connector of claim 1 in which there are seven grooves.

3. The connector of claim 1 in which a radius through a portion of any one of the grooves in the first set of grooves is disposed at a 45 degree angle to a radius through a corresponding portion of an adjacent groove.

4. The connector of claim 1 in which an outer end of each radial segment on the rotatable groove includes an outer wall extending toward the other outer wall on the same groove.

5. The connector of claim 1 in which the radial segments forming the rotatable groove and the radial segments on at least one of the other grooves both lie on radii extending from the common axis.

6. The connector of claim 1 in which the rotatable groove is rotatable about the common axis through an angle of at least about 33 degrees.

7. The connector of claim 1 in which the inner ring has a circularly cylindrical outer surface.

8. A two-piece connector for creating exhibits, both of the pieces having a uniform cross-section capable of being extruded, the connector comprising:
   nine radial segments disposed at equal distances from a common axis, seven of the radial segments being connected by a series of six rear seating walls to form six grooves, and the other two radial segments being connected by a seventh rear seating wall to form a seventh groove, with each radial segment on a groove being disposed at a 45 degree angle from the other radial segment on the same groove;
   an outer wall at the outer end of each radial segment on each groove, each outer wall on a groove extending toward the other outer wall on the same groove and being co-planar therewith, and each of the outer walls intersecting its respective radial segment at a common distance from the common axis; and
   an inner seating ring connected to the seventh rear seating wall and trapped by the series of six rear seating walls for rotation about the common axis through an angle of at least about 33 degrees.

* * * * *